June 4, 1963  H. R. HERMAN ETAL  3,091,845
METHOD FOR MAKING HONEYCOMB PANEL
Original Filed Nov. 26, 1954  6 Sheets-Sheet 1
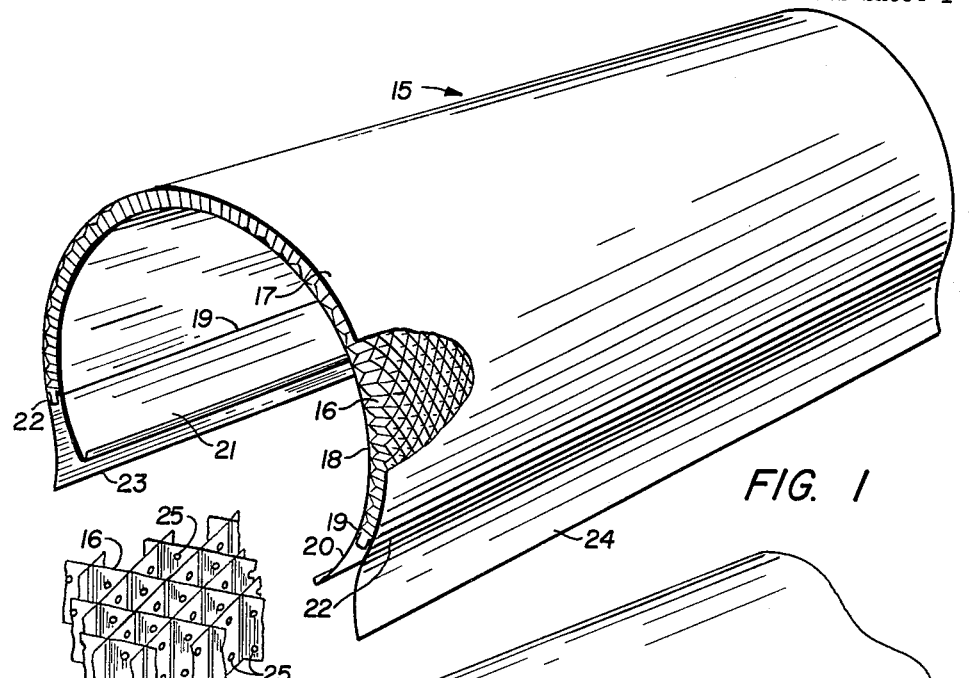
FIG. 1
FIG. 1A
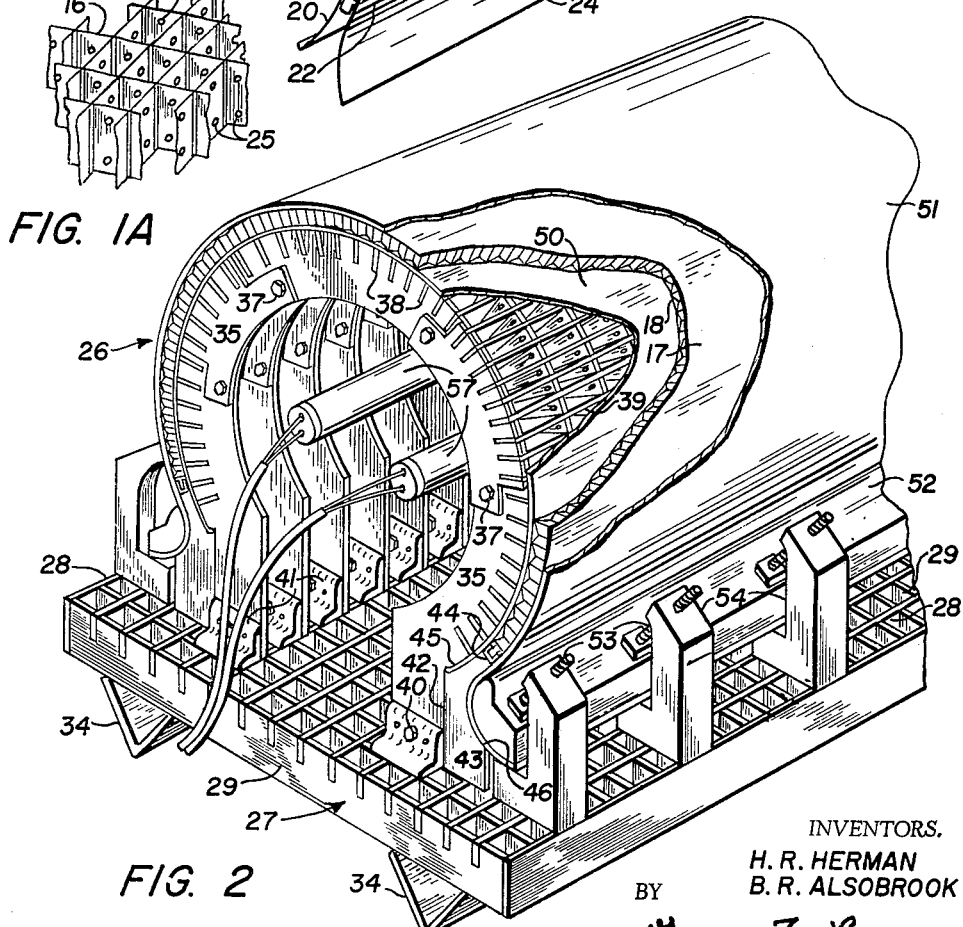
FIG. 2
INVENTORS.
H. R. HERMAN
B. R. ALSOBROOK
BY George E. Pearson
ATTORNEY INVENTORS.
H. R. HERMAN
B. R. ALSOBROOK
BY George E. Pearson
ATTORNEY INVENTORS.
H. R. HERMAN
B. R. ALSOBROOK
BY George E. Pearson
ATTORNEY June 4, 1963   H. R. HERMAN ETAL   3,091,845
METHOD FOR MAKING HONEYCOMB PANEL
Original Filed Nov. 26, 1954   6 Sheets-Sheet 5
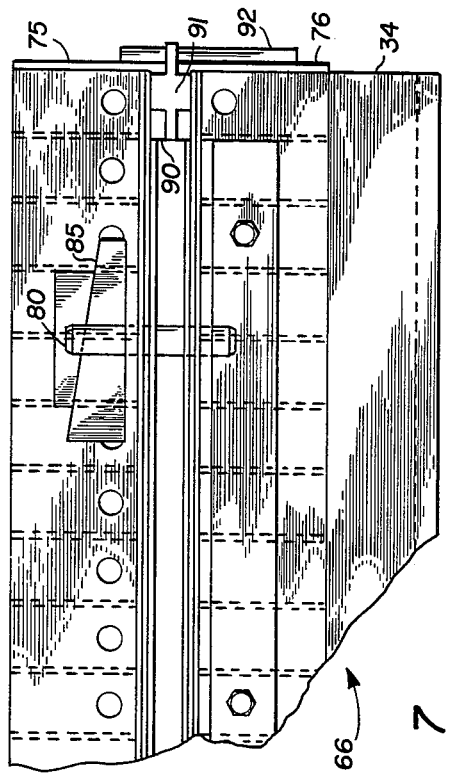
FIG. 7
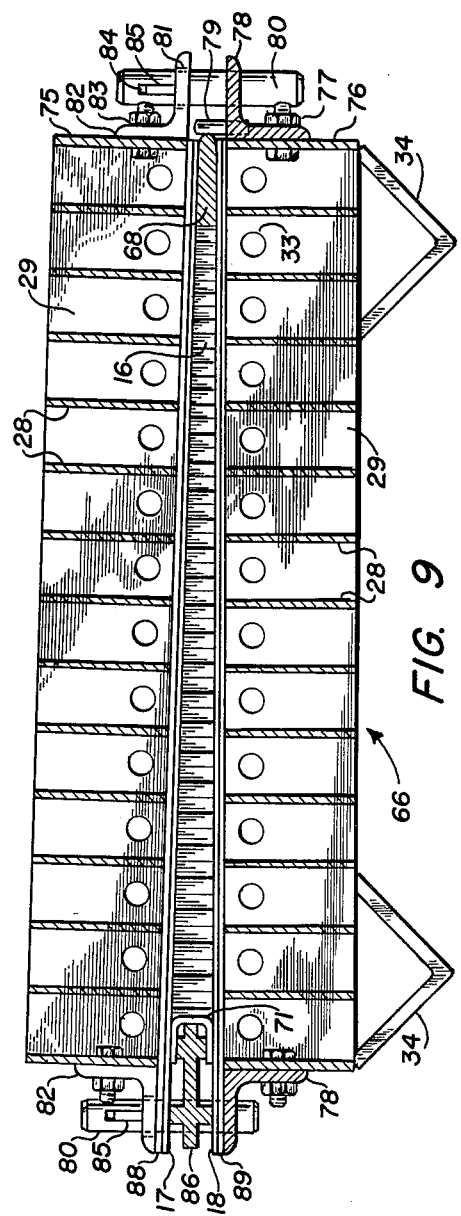
FIG. 9
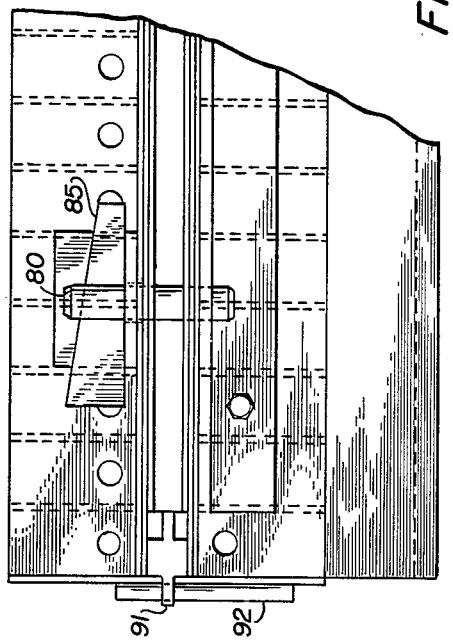
INVENTORS.
H. R. HERMAN
B. R. ALSOBROOK
BY
George E. Pearson
ATTORNEY June 4, 1963  H. R. HERMAN ETAL  3,091,845
METHOD FOR MAKING HONEYCOMB PANEL
Original Filed Nov. 26, 1954  6 Sheets-Sheet 6

INVENTORS.
H. R. HERMAN
B. R. ALSOBROOK
BY George E. Pearson
ATTORNEY

3,091,845
METHOD FOR MAKING HONEYCOMB PANEL

Hartley R. Herman, La Mesa, and Benjamin R. Alsobrook, Chula Vista, Calif., assignors to Rohr Corporation, a corporation of California
Original application Nov. 26, 1954, Ser. No. 471,394, now Patent No. 2,944,504, dated July 12, 1960. Divided and this application July 11, 1960, Ser. No. 48,797
4 Claims. (Cl. 29—471.1)

This invention relates to a panel structure of sandwich type in which thin metal shaped somewhat like a honeycomb is secured between two enclosing skins and to the apparatus and method used for fabricating such panel.

This application is a division of our copending application for Fixture for Making Honeycomb Panel, Serial No. 471,394, filed November 26, 1954, now Patent No. 2,944,504.

An object of the invention is to provide a fixture for holding the sandwich structure while its components are being brazed together which is capable of heating and cooling with the sandwich with a minimum amount of distortion.

Another object is to provide a holding fixture made up of a number of small individual components so connected together that it will remain rigid and hold its contour even when repeatedly heated to a temperature of about 2200° F.

A further object is to provide such a fixture having the general form of the usual cardboard partition used to pack eggs in egg crates, and to provide for the free circulation of gas through the individual strips making up the lattice work so that the sandwich may be heated substantially uniformly throughout.

Another object is to provide such a lattice structure which, while maintaining the necessary rigidity, is yet of small mass and heat capacity so that it requires only a small amount of heat to be supplied to it to raise its temperature to that required for brazing the sandwich components together.

Another object is to provide means for stiffening the lattice structure and preventing one portion of it from shifting with reference to other portions in addition to the rigidity provided by the contact of the lattice strips with each other. This additional stiffening means is preferably perforated to permit the free flow of gas therethrough for securing a more uniform heating.

A further object is to provide for a small amount of slippage of the sandwich with reference to the fixture by means of a thin sheet interposed between them, thereby preventing warpage and change in the sandwich contour as it cools after brazing.

Another object is to provide means between the supporting lattice and sandwich to prevent the concentration of pressure in narrow areas of the sandwich and assure a more uniform pressure distribution over the sandwich before and during the brazing.

In cases where the sandwich has a convex contour, a further object is to provide a thin metal sheet enveloping the sandwich and arranged to apply substantially uniform pressure to the various portions thereof, the thickness and material of the sheet preferably being such that the sheet cools at substantially the same rate as the sandwich.

Another object is to provide for the heating and brazing of the metal sandwich in a reducing or inert gas which will not form undesirable compounds of the metals such as those due to oxidation or carburization.

A still further object is to provide for the preheating of the sandwich assembly prior to brazing in a muffle not much larger than it to a temperature somewhat below the brazing temperature and to complete the brazing in a high temperature furnace in which the muffle and sandwich are placed, the furnace being heated by a suitable heating means to a temperature above the brazing temperature.

Another object is to provide such a muffle which will distribute the heat received from the source of furnace heat and prevent the heat rays from such source from directly impinging on the sandwich and thereby causing uneven heating thereof.

A further object is to provide for the slow, uniform cooling of the brazed sandwich by removing the muffle from the furnace and permitting the sandwich to remain in the muffle while cooling. This procedure prevents the cool ambient air from reaching the sandwich with resultant uneven cooling thereof.

Another object is to provide means for supporting the muffle out of contact with the furnace to permit free circulation of the furnace gases around the muffle thereby insuring its more even heating than if it rested on the furnace floor.

A further object is to provide a clamping structure for drawing an enveloping sheet against the sandwich in which an increase in clamping pressure is effected due to the difference in the coefficients of expansion of components of the clamping device. This arrangement compensates for the expansion of the enveloping sheet due to the large rise in temperature and holds it firm against the sandwich.

Further objects will become apparent as the description proceeds. For a better understanding of the invention reference is made to the accompanying drawings, in which:

FIG. 1 is a perspective view of a honeycomb sandwich embodying the invention;

FIG. 2 is a perspective view of a holding fixture containing the sandwich of FIG. 1;

FIG. 7 is an end view of the fixture of FIG. 6;

FIG. 9 is a sectional view on line 9—9 of FIG. 6 also showing a honeycomb panel in the fixture;

Figure 10:
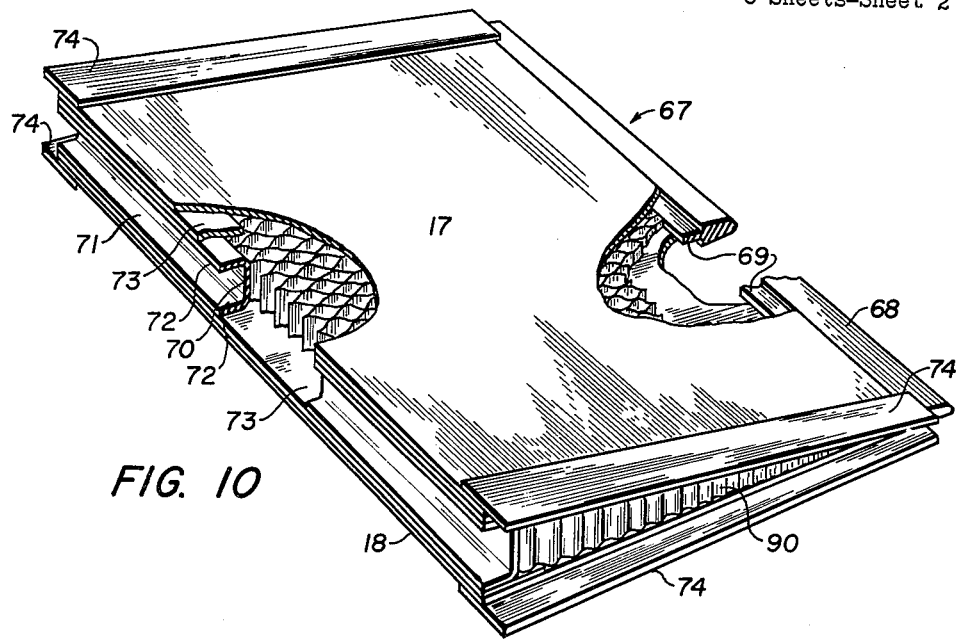
FIG. 10 is a perspective view of the sandwich panel shown in FIG. 9.

Referring to FIGS. 1 and 2 the invention is illustrated in connection with the construction of a honeycomb sandwich 15 having a central core composed of diamond shaped cells 16 which are connected together by welding or other known means, the outer ends of the cells being brazed to a covering skin 17 and their inner ends brazed to a concave shaped skin 18, the skin 18 terminating in straight edges 19 to which are brazed the ends of a pair of inwardly curved flanges 20, 21. The lower ends 22 of skin 17 are also straight and have brazed thereto outwardly curved flanges 23, 24 of the shape shown. All the above parts are preferably made of stainless steel which has high tensile strength and although the thickness of the metal composing the honeycomb cells may be only from 1 to 3-thousandths of an inch, nevertheless when the parts of the sandwich are brazed together the resulting structure has great strength and strongly resists torsion and bending. Prior to brazing, in a manner to be later described, the flanges 20, 21 are tack welded at spaced apart points to edges 19 and flanges 23, 24 similarly secured to the edges 22 of skin 17. As shown in FIG. 1A, the honeycomb is preferably provided with small holes 25 through the metal thereby providing passages through which gas may pass from one cell to another. The holes 25 thus assure that the pressure within all the cells is substantially the same.

Figure 3:
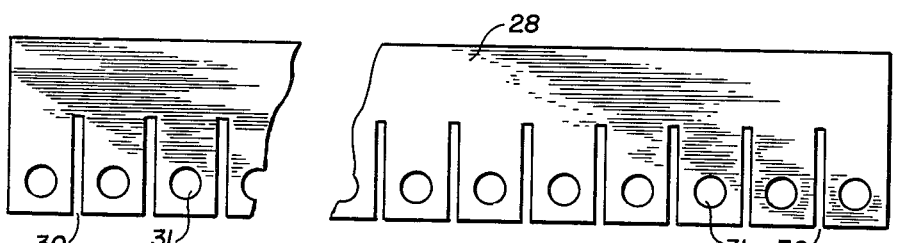
FIGS. 3 and 4 are views of lattice strips used in the fixture of FIG. 2.
Figure 4:
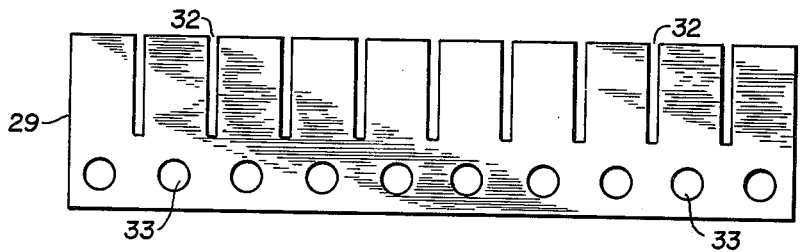

The brazing together of the aforementioned parts is done in a fixture 26 of the type shown in FIG. 2, which comprises a horizontal base 27 in the form of a lattice composed of a plurality of longitudinal strips 28 interlocked with a plurality of transverse strips 29. Each strip 28 has a series of equally spaced apart slots 30 and a set of holes 31 therethrough and each strip 29 has a series of equally spaced apart slots 32 and a set of holes 33 therethrough, as shown in FIGS. 3 and 4. By assembling the strips together so that the unslotted portion of each longitudinal strip 28 fits into the slots of the transverse strips 29, in a manner similar to the cardboard partitions used to pack eggs in egg crates, a rigid lattice 27 is provided which contains a relatively small amount of metal, is light in weight and may easily be assembled and taken apart. For certain purposes it is desirable to further stiffen the lattice by securing its component strips together at their points of intersection by welding or other means (not shown). If the top of the lattice is not plane within the desired tolerance, it may be made flat within a tolerance of .001 inch by grinding. The top face of the lattice serves as a horizontal reference or datum plane of the fixture. The strips 28 and 29 are preferably composed of a steel alloy capable of standing high temperatures without appreciable distortion and may be about .062 inch thick when the strips composing the lattice are 1 inch apart. The holes 31, 33 permit hot gas to circulate through the lattice structure promoting its more rapid heating and more uniform temperature. Attached to the bottom of the lattice are a set of angle irons 34, the center only of each angle being preferably welded to the lattice. These angles support the lattice while the fixture is heated as described below and permit the lattice to freely expand and contract unrestrained by the angles which may expand at a different rate than the lattice so that buckling of the lattice would result if it were secured to both ends of the angles. The free space between the angles and lattice permits the free circulation of hot gases therethrough to assist in the rapid heating of the fixture and a more uniform temperature distribution.

A plurality of similar formers 35 have flat edges 36 seated on lattice 27, each former preferably being composed of a plurality of annular segments secured together by bolts 37, as shown. Deep slots 38 are cut in the periphery of each former and longitudinally extending thin strips 39 are seated in these slots so that the several formers are in alignment and parallel to each other. Each former is secured in place to lattice 27 by bolts 40 which pass through a pair of angle irons 41 which are welded or otherwise secured to lattice 27. Near its base each former terminates in a vertical edge 42, against which rests the vertical edge of former extension 43 whose upper end 44 engages the end of the honeycomb sandwich and whose curved edges 45, 46 fit against flanges 20, 24 respectively and flanges 21, 23. After assembling the formers 35 and lattice strips 39, if their outer edges do not exactly conform to the desired shape, the outside periphery of the assembly is ground or otherwise machined to shape.

Before assembling the sandwich components shown in FIG. 1, the inside face skin 17 and outer face of skin 18 are covered with brazing material as are also the edges 19 and 22 of the four channel members. The brazing material may be of any known type which is compatible with the metals to be brazed together and, in the illustrated example, may be a thin coating of acrylic resin applied by a spray gun. The metal brazing alloy may then be applied as a thin sheet or as a fine powder dusted or sprayed onto the resin coating. Before placing the assembled prepared sandwich in the brazing fixture, a stainless steel sheet 50 having a thickness of about .020" is laid on the curved periphery of the fixture to cover all the formers and strips 39 and the assembled sandwich then placed in position, as shown in FIG. 2. The former extensions 43 are then put in place and an enveloping sheet 51 of stainless steel draped over the sandwich and the flanges 23, 24. Sheet 51 preferably is between .030 and .040" thick and made of stainless steel. Elongated clamp jaws 52 are pressed against the lower ends of sheet 51 by means of a series of bolts or screws 53 threaded in spaced apart similar supports 54. The face of jaw 52 which presses against sheet 51 is serrated or otherwise roughened to give a better grip and is contoured to the shape of flange 24. Each support 54 is attached to lattice base 27 preferably by a bolt (not shown) which passes through the lattice and enters a threaded hole in the bottom of the support. All the supports together with their adjusting screws are thus readily removed from the lattice. Supports 54 may be made of Invar alloy and screws 53 of metal which has a substantially higher coefficient of expansion than Invar so that as the temperature increases during the brazing, the screws exert a somewhat greater pressure on jaws 52 which in turn keep enveloping sheet 51 tightly pressed against the outer skin 17 of the sandwich notwithstanding the increase in length of sheet 51 between jaws 52 due to increase in temperature.

Figure 5:
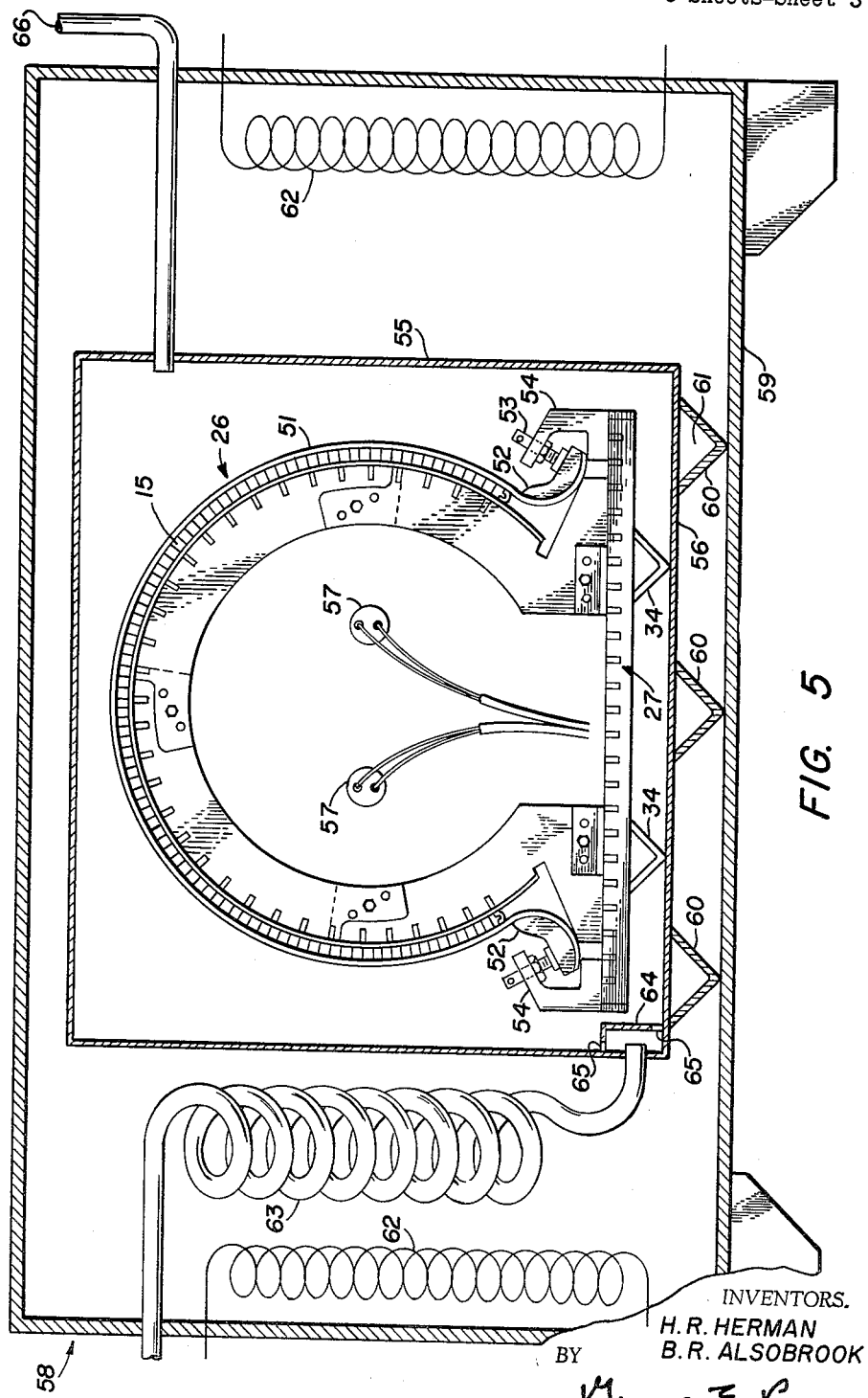
FIG. 5 is a view partly in seciton and partly diagrammatic of a honeycomb sandwich and muffle in a furnace.

After sheet 51 has been drawn tight to conform the sandwich 15 to the peripheral contour of the lattice comprising the formers 35 and strips 39, the assembly is placed in a stainless steel enclosing muffle 55 (FIG. 5) which is substantially airtight, with the angles 34 resting on the floor 56 of the muffle. A stream of argon gas is then passed into the muffle to purge it of air and a stream of hydrogen gas then passed into it until the muffle and honeycomb are completely filled with hydrogen. The sandwich and muffle are then preheated by any suitable heating means to a temperature of about 500° F., the heater illustrated consisting of two Calrod electric heaters 57 supplied with current from the usual A.C. source (not shown). It will be understood that more than two heaters may be used, if desired. This heating partly purges the muffle and assures the removal of all moisture therefrom.

After preheating in the muffle, the muffle and sandwich are placed in a high temperature furnace 58, the muffle being supported above the floor 59 of the furnace by a plurality of angle irons 60 arranged to provide open spaces 61 through which the furnace gases may circulate to accomplish more uniform heating. The furnace walls are preferably lined with fire brick (not shown) in a known manner. The furnace may be heated by a plurality of electric heaters 62 diagrammatically shown or by hot combustion gases supplied from a burner (not shown), the temperature in the furnace being maintained from 150° to 200° F. above the melting point of the brazing alloy. An inert gas as, for example, hydrogen which will not oxidize or otherwise form compounds with the metal of sandwich 15 is introduced into a metal heating coil 63 in the furnace, the outlet of the coil discharging the hot gas against a baffle 64 in the muffle, the baffle having discharge outlets 65 which serve to direct the hot inert gas along the wall of the muffle and thus prevent it from impinging directly on the sandwich with resultant uneven heating thereof.

As soon as the furnace door (not shown) is closed, the inert gas is passed through coil 63 to heat it, the gas leaving through a pipe 66. Soon after the sandwich and interior of the muffle have reached the brazing temperature, as indicated by one or more pyrometers (not shown) having their terminals in the muffle, the gas supply to pipe 63 is shut off and the muffle removed from the furnace and allowed to cool in the ambient air with the fixture 26 and the brazed sandwich therein. While cooling, another hydrogen supply is connected to supply gas into the muffle against baffle 64, the hydrogen being supplied until the sandwich cools down to about 800° F., and serving to prevent oxidation of the sandwich. The hydrogen supply is then stopped and argon supplied instead, argon being admitted to the muffle until it has reached normal room temperature. The argon supply is then shut off and the cooled fixture and sandwich removed from the muffle.

While one muffle is cooling, another preheated one with its contained sandwich may be placed in the furnace and the brazing effected in the manner described. The furnace is thus fully utilized and it is not necessary to fill it with inert gas while the brazing is effected. Also a further saving in this gas is secured by making the muffle 55 only slightly larger than fixture 26.

FIGURES 6 to 9 show a lattice fixture 66 adapted to support the several parts of the sandwich panel 67 shown in FIG. 10 during brazing. This panel comprises core cells 16 of the type previously described, an upper metal sheet or skin 17 which is to be brazed to the upper end of the cells and a lower sheet 18 to be brazed to their lower end, the planes through the ends of the cells tapering toward a tapered bar 68 which is recessed to provide faces 69 to which the ends of sheets 17, 18 are brazed. The end of the cell core opposite bar 68 is brazed to the vertical web 70 of a channel 71 whose outwardly extending legs 72 are brazed to a pair of elongated doublers 73 which also overlie the cell core and are brazed thereto and also to the sheets 17, 18. Brazed to the ends of sheets 17, 18 and extending past the ends of the cell core are four strips 74 which serve to distribute any applied load over a larger area of the cell core, the ends of these strips also being brazed to bar 68.

Figure 8:
FIG. 8 is a detail of FIG. 6.

Fixture 66 is a lattice having longitudinal strips 28 and transverse strips 29 which are interlocked in the manner above described, the fixture having an upper section 75 whose lower surface is ground flat preferably within a tolerance of .001 inch and a lower section 76 whose upper face is ground flat within the same tolerance. Lower section 76 has a pair of angles 34 attached to it in the manner above described for supporting the fixture in a muffle. Attached to the rear side of section 76 by bolts 77 is an angle iron 78 in which are seated the ends of three aligned locating pins 79 against the upper ends of which the curved end of bar 68 abuts. Secured in angle 78 are a plurality of cylindrical guide pins 80 which enter holes 81 in an angle 82 secured to upper fixture section 75 by bolts 83. Pins 80 have narrow slots 84 to receive wedges 85. At the opposite end of the fixture similar angles 82, 78 are provided but instead of the locating pins 79 locating blocks 86 of the shape shown in FIGS. 8 and 9 are used, each block having a hole 87 through which guide pin 80 passes. These guide pins also pass through holes in two thin metal sheets, the upper sheet 88 extending over the top of the sandwich and the lower sheet 89 over its entire bottom face. The sheets 88, 89 function to distribute the pressure in the same manner as above described in connection with the sheet 50. The uncovered ends 90 (see FIG. 10) of the honeycomb core are restrained by restraining blocks 91 held in place by pins 92 whose lower ends are attached to bottom fixture section 76 by welding or other means (not shown).

Figure 6:
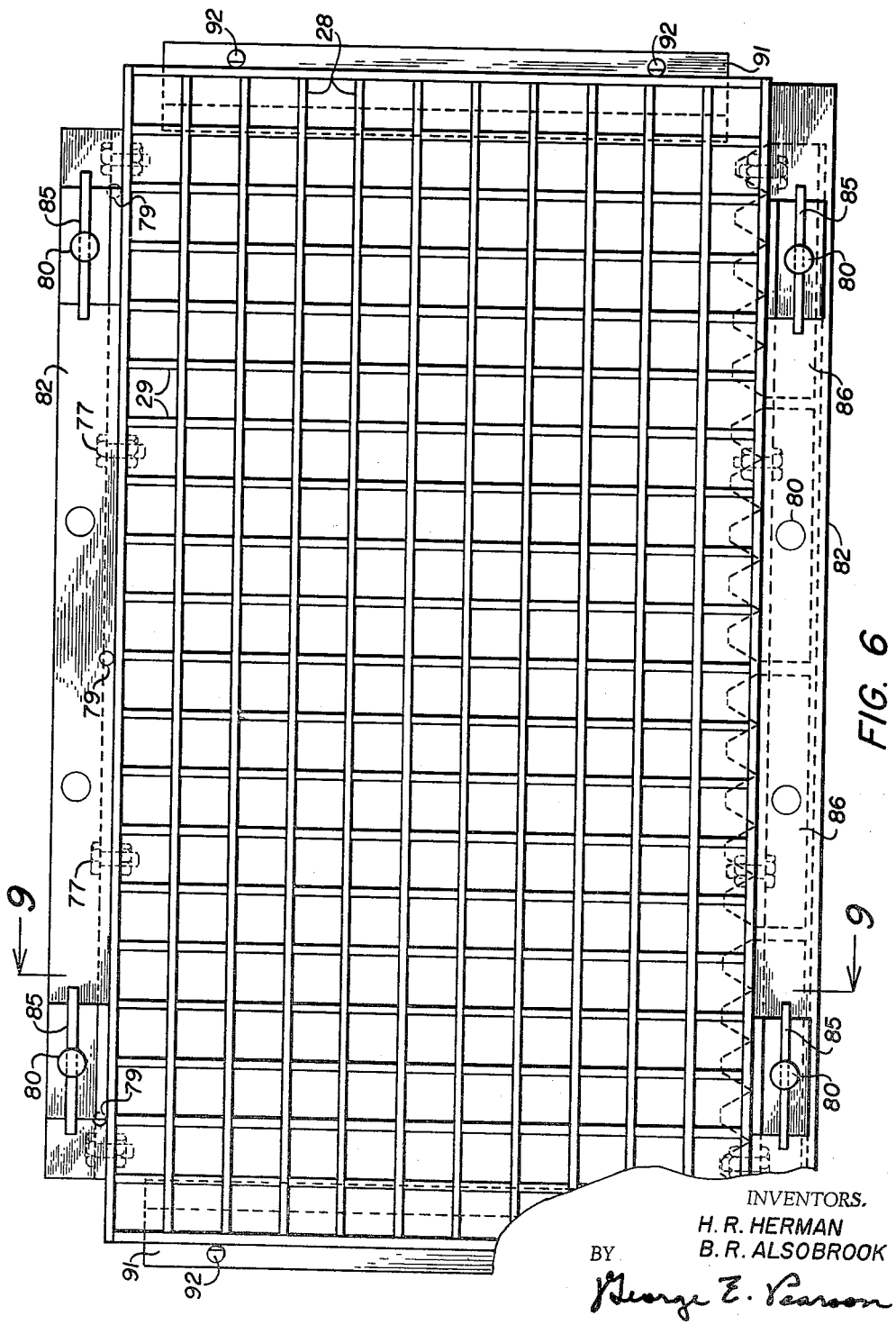
FIG. 6 is a top view of a holding fixture illustrating a modified form of the invention.

To weld the component parts of the sandwich together, the surfaces to be welded are treated as above described in connection with FIG. 2, sheet 89 placed on lower section 76 and the other parts positioned as shown in FIGS. 6, 7 and 9. If the weight of upper fixture section 75 provides sufficient pressure to hold the parts to be brazed in firm contact with each other, the wedges 85 need not be used. Otherwise the wedges are driven to provide sufficient pressure. The fixture and sandwich are then placed in a muffle and the brazing accomplished in the same manner as above described in connection with FIG. 5.

Figure 11:
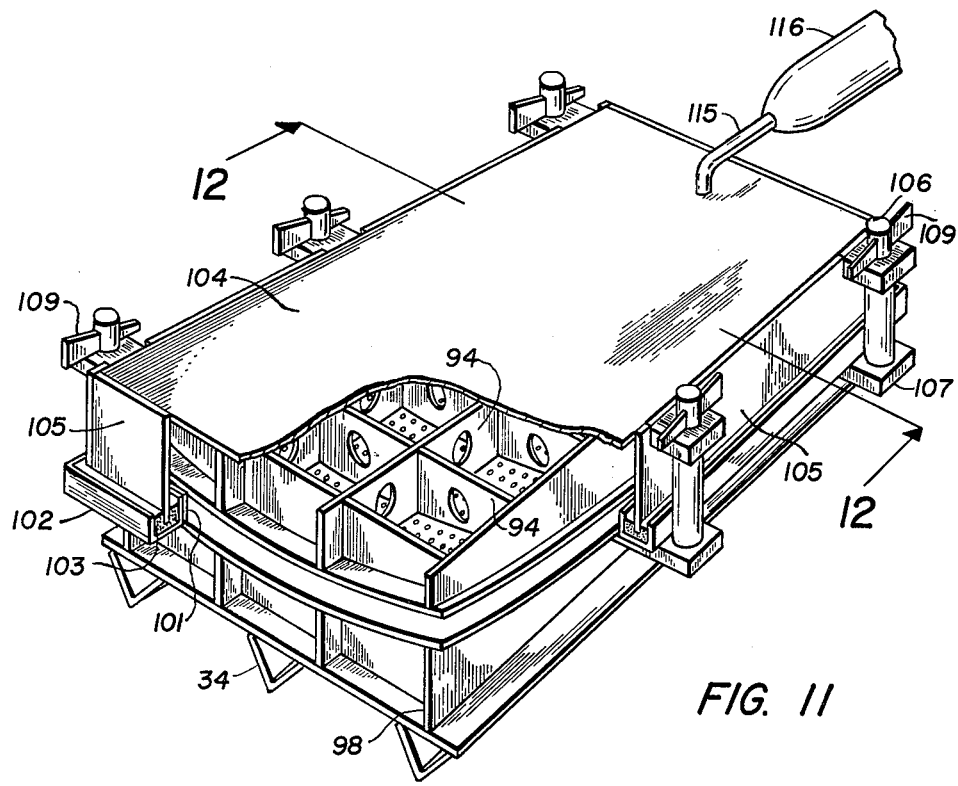
FIG. 11 is a perspective view showing a holding fixture containing a sandwich panel.
Figure 12:
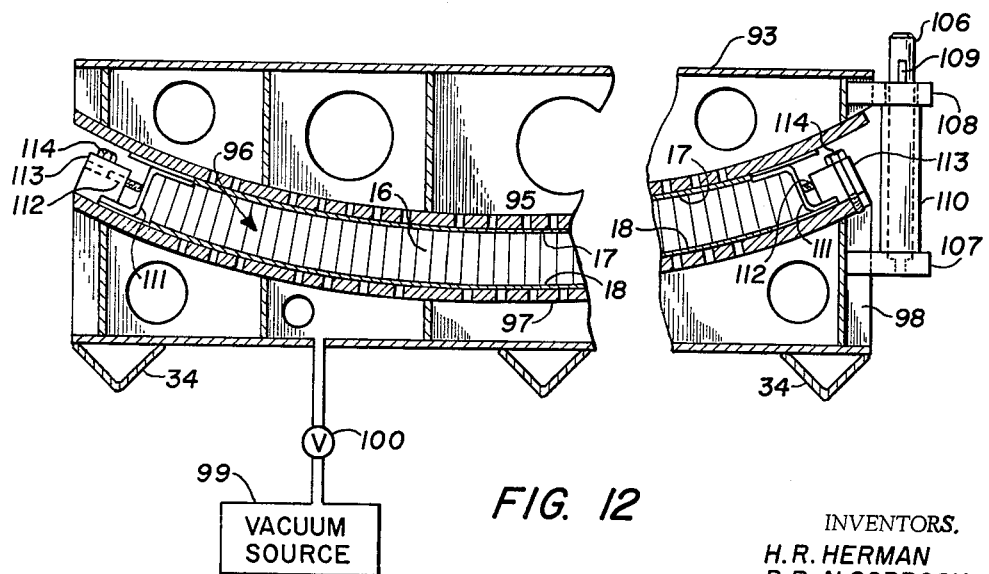
FIG. 12 is a sectional view on line 12—12 of FIG. 11.

FIGS. 11 and 12 illustrate an embodiment of the invention in which vacuum and gas pressure are utilized to apply pressure to a sandwich structure to hold the skins 17 and 18 in contact with the ends of cells 16. The upper section 93 of the fixture has intersecting lattice strips 94 of the type above described, the lower edges of which rest on a perforated plate 95 whose lower face is ground to the contour of the desired sandwich 96. Plate 95 rests on the upper skin 17 which is to be brazed to the upper end of cells 16. The skin 18 to be brazed to the lower end of the cells rests on perforated plate 97 whose top face is ground to the curved contour of sandwich 96. The bottom section 98 of the fixture is airtight and may be connected to a vacuum pump 99 by a valve 100. Bottom section 98 has attached thereto a vertical plate 101 (FIG. 11) which carries a channel 102 in which is disposed a continuous mass of sealant material 103. Upper fixture section 93 has hermetically secured thereto a rectangular hollow casing 104 having vertical side and end walls 105 which extend into the sealant 103. Upper section 93 is guided by a set of vertical pins 106 whose lower ends are secured to brackets 107 which in turn are attached to the sidewall of fixture section 98. Wall 105 has attached to it a set of plates 108 drilled to receive and slide along the pins 106, the latter being slotted to receive the wedges 109. Surrounding the pins 106 are sleeves 110 whose length is such that they take the weight of the fixture section 93 and prevent its weight from bearing on sandwich 96. A pair of Z shaped bars 111 extend along the entire side edges of core 16 and are brazed thereto, the webs of these bars being pressed against the core by a plurality of screws 112 spaced about 6 inches apart. The screws 112 are threaded into supports 113 which are attached to the sides of plate 97 by bolts 114. The sides of the panel are thus maintained to the required dimensions.

The brazing material having been applied to the top of sheet 18 and bottom of sheet 17 and to those faces of Z bars 111 which contact the sandwich panel, the panel is placed in the fixture, the top portion 93 of the fixture lowered into position and the screws 112 adjusted. The fixture is then purged with argon gas and placed in a brazing furnace of the type above described. Valve 100 is then opened to apply vacuum to the interior of fixture section 98 and the bottom face of skin 18, thereby drawing this skin into contact with plate 97 and causing it to conform to the contour of its top face. Simultaneously dry hydrogen gas under pressure is conducted into hollow casing 104 by a pipe 115 leading from a tank 116 of dry hydrogen gas. This gas reaches the top face of skin 17 and presses the skin firmly against core 16 and causes the core to conform to the contour of its bottom skin 18 so that the entire panel has the desired size and contour prior to reaching the brazing temperature in the furnace and during the brazing. When the brazing is complete, the fixture and panel are removed from the furnace and the vacuum maintained under sheet 18 and the hydrogen pressure over sheet 17, until the parts have cooled to about 800° F. when the entire fixture is purged with argon gas and the brazed panel removed therefrom.

In each of the illustrated examples, in order to prevent the accidental brazing of the fixture to the honeycomb panel, those parts of the fixture which contact the panel are covered with a thin coating of chromium oxide or aluminum oxide ($Al_2O_3$). The entire fixture may be plated with chromium in a known manner and the plated fixture then heated in an oxidizing atmosphere to convert the plating to chromium oxide.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described the invention, what we claim as new and useful and desired to secure by Letters Patent is:

1. The method of brazing together the cellular core and skins of a honeycomb sandwich which comprises the steps of coating a face of each skin with brazing alloy; placing the sandwich in a fixture constructed to press the coated skin faces against the ends of the core; placing the fixture and sandwich in a muffle; passing an inert gas into the muffle to remove the air therefrom; placing the muffle with the sandwich therein in a furnace heated to a temperature above the melting point of the brazing alloy; passing a stream of hydrogen gas into the muffle while the sandwich is heating to the brazing temperature; removing the muffle with the sandwich enclosed therein from the furnace; and allowing the muffle and sandwich to cool to a temperature substantially below the melting point of the brazing alloy.

2. The method of brazing together the cellular core and skins of a metallic honeycomb sandwich which comprises the steps of coating a face of each skin with brazing alloy; securing the sandwich in a fixture constructed to press the coated skin faces against the ends of the core; placing the fixture and sandwich in a muffle; passing a stream of argon into the muffle to remove the air therefrom; heating the muffle and sandwich to a temperature above 212° F. but lower than the melting point of the brazing alloy; placing the preheated muffle and sandwich in a furnace having a temperature somewhat above the melting point of the brazing alloy; passing a stream of hydrogen gas into the muffle while the sandwich is heating to the brazing temperature; removing the muffle with the sandwich therein from the furnace; and allowing the muffle and sandwich to cool to a temperature substantially below the melting point of the brazing alloy while continuing to pass hydrogen gas into the muffle.

3. The brazing methods as set forth in claim 1 and including the further step of coating portions of said fixture disposed adjacent said brazing alloy with an oxide of a metal of the group consisting of aluminum and chromium, thereby to prevent said melted brazing alloy from becoming attached to said portions of the fixture.

4. The brazing method as set forth in claim 3, said oxide coating step comprising the steps of plating a thin layer of chromium on the surface of said fixture, and oxidizing the chromium to provide a thin covering of chromium oxide on the fixture.

References Cited in the file of this patent

UNITED STATES PATENTS

| | | |
|---|---|---|
| 428,056 | Smith | May 13, 1890 |
| 2,166,998 | Morgan | July 25, 1939 |
| 2,235,965 | Ness | Mar. 25, 1941 |
| 2,243,979 | Reynolds | June 3, 1941 |
| 2,276,847 | Kelley | Mar. 17, 1942 |
| 2,406,310 | Agule | Aug. 27, 1946 |